US012412194B2

(12) United States Patent
Ortiz et al.

(10) Patent No.: US 12,412,194 B2
(45) Date of Patent: Sep. 9, 2025

(54) SYSTEMS AND METHODS FOR ESTABLISHING DATA LINKAGES

(71) Applicant: ROYAL BANK OF CANADA, Toronto (CA)

(72) Inventors: Edison U. Ortiz, Orlando, FL (US); David Ian Mckay, Toronto (CA); Christoph Knoess, Sag Harbor, NY (US); Ravi Khandavilli, Toronto (CA); Adel Al Nabulsi, Toronto (CA); Justin Simonelis, Toronto (CA); Richard Lee Robertson, Winter Haven, FL (US)

(73) Assignee: ROYAL BANK OF CANADA, Toronto (CA)

( * ) Notice: Subject to any disclaimer, the term of this patent is extended or adjusted under 35 U.S.C. 154(b) by 727 days.

(21) Appl. No.: 17/701,612

(22) Filed: Mar. 22, 2022

(65) Prior Publication Data

US 2022/0301013 A1 Sep. 22, 2022

Related U.S. Application Data

(60) Provisional application No. 63/164,444, filed on Mar. 22, 2021.

(51) Int. Cl.
 *G06Q 30/00* (2023.01)
 *G06N 20/00* (2019.01)
 (Continued)

(52) U.S. Cl.
 CPC ......... *G06Q 30/0269* (2013.01); *G06N 20/00* (2019.01); *G06Q 20/382* (2013.01); *G06Q 20/401* (2013.01); *G06Q 2220/00* (2013.01)

(58) Field of Classification Search
 CPC ............ G06Q 30/0629; G06Q 20/382; G06Q 20/401; G06N 20/00
 See application file for complete search history.

(56) References Cited

U.S. PATENT DOCUMENTS

| 9,560,014 B2 | 1/2017 | Grobman et al. |
| 2013/0191223 A1* | 7/2013 | Harris ............... G06F 16/24575 |
| | | 705/14.66 |

(Continued)

OTHER PUBLICATIONS

Priebe C. et al., "Enclave DB: A Secure Database using SGX", 2018 IEEE Symposium on Security and Privacy (SP), May 24, 2018, pp. 264-278, online, retrieved on Apr. 6, 2022, <DOI:10.1109/SP.2018.00025> (Year: 2018).*

(Continued)

*Primary Examiner* — Anand Loharikar
(74) *Attorney, Agent, or Firm* — Norton Rose Fulbright Canada LLP

(57) ABSTRACT

Systems and methods for establishing data linkages are described in various embodiments. A system architecture is described which provides a data processing orchestrator device or service which securely interoperates with data sets at various points in time associated with a set of interactions a user may have with computer systems. The data sets are obtained from different data repositories, and are combined together for analysis such that a first data set representing intents (e.g., web search/browse history) can be combined together with a second data set representing outcomes (e.g., purchase transaction history, web site shopping carts).

14 Claims, 16 Drawing Sheets

(51) Int. Cl.
    *G06Q 20/38*         (2012.01)
    *G06Q 20/40*         (2012.01)
    *G06Q 30/0251*     (2023.01)

(56) References Cited

U.S. PATENT DOCUMENTS

| | | |
|---|---|---|
| 2014/0074623 A1 | 3/2014 | Mohammadi et al. |
| 2015/0073863 A1 | 3/2015 | Malgatti et al. |
| 2015/0332311 A1 | 11/2015 | Patel et al. |
| 2016/0105402 A1 | 4/2016 | Soon-Shiong et al. |
| 2017/0323029 A1 | 11/2017 | Rissanen |
| 2019/0362083 A1 | 11/2019 | Ortiz et al. |
| 2020/0014691 A1 | 1/2020 | Ortiz et al. |
| 2020/0193485 A1 | 6/2020 | Field |

OTHER PUBLICATIONS

Canadian Intellectual Property Office (CIPO), International Search Report and Written Opinion against PCT Application No. PCT/CA2021/051273, Dec. 7, 2021.
Canadian Intellectual Property Office (CIPO), International Search Report and Written Opinion against PCT Application No. PCT/CA2021/051272, Dec. 1, 2021.
Canadian Intellectual Property Office (CIPO), International Search Report and Written Opinion against PCT Application No. PCT/CA2022/050430, Apr. 27, 2022.
Priebe C. et al., Enclave DB: A Secure Database using SGX, 2018 IEEE Symposium on Security and Privacy (SP), May 24, 2018, pp. 264-278, online, retrieved on Apr. 6, 2022, <DOI:10.1109/SP.2018.00025>.
Supplementary European Search Report for EP 22803502 dated Apr. 14, 2025.

\* cited by examiner

Inspired by your search history

8% Cashback   5% Cashback   2x Points   1.5x Points

SYSTEMS AND METHODS FOR ESTABLISHING DATA LINKAGES

CROSS REFERENCE

This application is a non-provisional of, and claims all benefit, including priority to, U.S. Application No. 63/164,444 dated 2021 Mar. 22 and entitled SYSTEMS AND METHODS FOR ESTABLISHING DATA LINKAGES, incorporated herein by reference in its entirety.

FIELD

Embodiments of the present disclosure generally relate to the field of computerized prediction generation, and more specifically, embodiments relate to devices, systems and methods for establishing data linkages for use in establishing computerized predictions.

INTRODUCTION

Generating computerized predictions is challenging when different data sets are stored in disparate data storage by disparate parties, each having their own data security and data privacy obligations. Furthermore, generating accurate computerized predictions may require a holistic usage of multiple data sets whose linkages are not entirely causal, but rather, are probabilistic. Accordingly, computerized predictions are difficult to technically implement due to a high level of uncertainty and complexity of interrelationships to be modelled. This is compounded by a large number of potential paths and spurious relationships, which become major technical challenges when establishing a system for a large number of users.

SUMMARY

Systems and methods for establishing data linkages are described in various embodiments. A system architecture is described which provides a data processing orchestrator device or service which securely interoperates with data sets at various points in time associated with a set of interactions a user may have with computer systems. The data processing orchestrator device can be used, for example, for a computational personalization tool, including, for example, an offer recommender. The offer recommender can, either based on a user's profile or in response to a specific user query, determine one or more offers to be surfaced to the user. Specific approaches are proposed herein to improve the relevance of offers surfaced to the user, in particular, based on machine learning-based representations of the user's intent, actual purchases, and data linkages maintained there between. Accordingly, offers may be surfaced having specific parameters relevant to the user's tracked intent, previous purchase behavior, or a combination of both. The proposed approach is particularly useful when the user's tracked intent does not clearly indicate a particular product at a specific vendor at a specific price, but rather the tracked intent represents natural queries generated by a user in the context of a purchasing journey, including open ended queries, less specific queries, and research-based queries. Each of these queries can be mined to assess intent, and coupled with outcome information, a probabilistic mapping can be established that can then be used to select and improve the relevancy of offers.

Furthermore, certain approaches described herein are further useful in automatically distinguishing offers from one another based on an automatic biasing from a reinforcement learning mechanism that uses a multi-armed bandit approach for training using selections from similar offers to reward or penalize a model, fine-tuning offer parameters over time (e.g., for example, if a user is single, over time, based on selection preferences, the system may start biasing the offer parameters towards direct discounts for single items over volume discounts). A multi-armed bandit approach is useful in further fine-tuning the model representations and linkages, as there may be specific characteristics in a particular transaction that help yield a positive purchase outcome.

As described in further embodiments, a variant approach is described also in respect of reinforcement learning based machine learning approaches using a multi-armed bandit modelled computational agent for automatic offer variation exploration and optimization over time. In this variant approach, multiple offers are presented to the user selected, for example, based on relevance (e.g., semantic relevance) to a query, and the offers are selected to have similar offer characteristics with minor variations. Based on a tracked user's selection, the model is re-trained to bias towards the characteristics that distinguished the selection, and/or to penalize the characteristics in the non-selected offers that distinguished the non-selected offers from the selection. If the user selects no offer, all of the offers could be used for reinforcement learning penalties.

Semantic analysis approaches are also described in another variant embodiment where the search query or intent data elements are replaced with semantic variants to increase a volume of search inputs (e.g., to improve training when results cannot be stored for future analysis) or a quantity of potential offer results (e.g., to avoid having a blank page of offers).

The data sets are obtained from different data repositories, and are combined together for analysis such that a first data set representing intents (e.g., web search/browse history) can be combined together with a second data set representing outcomes (e.g., purchase transaction history, web site shopping carts). The combination of the first data set representing intents and the second data set representing outcomes allows for an improved ability to track and generate estimations of potential future activities, such as whether a purchase transaction will be consummated from a tracked intent, and in some embodiments, where an estimation of a potential future activity indicates a low probability of consummation, additional steps may be automatically applied to improve the probability of consummation. The second data set representing outcomes can include offers and offer parameters which led to a particular outcome (e.g., the user purchased the widget with a 5% student discount and free shipping).

These additional steps, for example, can include a offer recommender engine that is a coupon recommender system, that is adapted for reinforcement learning based on various input features such as user behaviours (number of transactions, clicks, recent searches, next best merchant), and coupons (e.g., category, colours used in image, description text). In a further embodiment described herein, a multi armed bandit computational model can be implemented based on a combination of actions and rewards, rewarding or penalizing a model accordingly to refine model recommendations over time. The model is deployed to adapt to a dynamic environment for use in generation recommendations in real or near-real time for incoming data sets.

The output recommendations can be generated, for example, in the form of output logits or predictions coupled to specific offers or recommendations such that the offers or recommendations are ranked or re-prioritized by a downstream system for changing an order or rendering choices for a particular user in a user interface. Accordingly, a next best offer, coupon, recommendation, or merchant can be identified. As described in further embodiments herein, specific text embedding approaches can be used for semantic search along with cosine similarity scores to provide a level of extensibility to the exact search terms being used.

Combining the data for analysis aids in overcoming visibility issues associated with approaches where only web query data or only payment processing data is used for automatically generating computer-based recommendations or promotions.

For example, the first data set can include data sets generated during an exploration or information gathering phase of an eCommerce interaction. As described further below, intents can be estimated either at a individual transaction level, or intents can be estimated a cross-transaction level (or both).

The first data set representing intents is tracked based on internet-based activities, and can represent information tracked during an enhanced shopping experience. During the enhanced shopping experience, a user may be logged into or otherwise associated with an account (e.g., logged into an account associated with an active directory identity), and the user may conduct various types of internet browsing or searching activity using an internet browser (e.g., interfacing with a search engine), or various mobile applications (e.g., a shopping application associated with a particular vendor or aggregation of vendors).

The first data set can include one or more identifiers or surrogate identifier values that are utilized to identify which data set elements are associated with which user. In some embodiments, the surrogate identifier values are utilized such that an actual account identifier of the user is not used directly. For example, the user may be required to login to a web search or browser, which automatically begins tracking using the relevant identifier value.

During these interactions, the specific results provided back to the user can be personalized, which may include modifications of the ordering of results (e.g., prioritization), individualized or recommended offers and marketing campaign materials, among others. As described later, these personalizations may be modified through downstream learning and interconnections between the first data set representing intents and the second data set representing outcomes. Personalizations can further include recommending various financial products (e.g., using a specific card, loans, pay by bank, buy now pay later) based on the tracked data linkages. In some embodiments, personalizations may also interface elements rendered based on an impact on a user's creditworthiness or various financial metrics, such as an income to spend ratios, debt/income calendars, loyalty point trackers, among others (e.g., a financial "genie" noting whether a purchase is in accordance with specific financial outcomes). Personalizations may be represented by data objects that may be generated on a tailored basis, or generated in batch and provided to intent tracker engine 102.

The second data set representing outcomes is tracked based on financial transaction information, where a number of payment services are interlinked with an orchestrator engine that is configured to interoperate with various point-of-sale engines to track transaction level information that can be coupled to the user. The second data set representing outcomes can include tuples of transaction data, such as merchant/vendor identifiers, amounts paid, whether a purchase is a one-time payment or a recurring payment, among others. The second data set representing outcomes, in some embodiments, is provided at a product/service level of detail (e.g., SKU-level data). In other embodiments, the second data set is only provided at a transaction level of detail (e.g., $1200 at Computer Hardware Merchant).

The orchestration engine, in some embodiments, is configured to receive the first data set and the second data set, and establish data linkages to aid in coupling a representation of intents and outcomes together to estimate whether research or investigations into a purchase (e.g., web searches) culminated in actual purchases, whether the purchase attempt was simply abandoned, whether the purchase attempt is still on-going, or whether the purchase attempt is part of a larger wave of purchases related to a common intent (e.g., purchasing faucets relating to a home renovation). In some embodiments, due to privacy restrictions, the orchestration engine is configured to make estimations based on incomplete data sets (e.g., fields missing, user identifiers missing), for example using semantic matching.

Where product/service level details are not available, the orchestration engine is configured to estimate, from transaction details potential products or services that were purchased as part of each transaction. For example, if the user conducts a search relating to specific mid-tier laptops, and a purchase of $1200 at Computer Hardware Merchant was tracked, the transaction may automatically be estimated or flagged based on the user's search history and results, and associated with a specific mid-tier laptop that was around the price point from the user's search history and results.

A challenge with this approach is that it can be difficult to separate out specific products or services purchased together in a same transaction, such as when laptops are bundled with additional accessories or warranties in a single purchase. Where SKU level details are available for some users and not all, transactions as between different users can be utilized to train a machine learning backend system for improved accuracy in product/service level estimation.

The orchestrator may be configured to interoperate with the account identity manager for tracking the internet-based activities to establish a common identity for the user based on a known correspondence between an identity associated with the first data set, as well as an identity associated with the second data set (e.g., a financial account user identity). In situations where an identity cannot be established directly (e.g., for privacy reasons), in some embodiments, demographic information is received and the first data set or the second data set can be associated with either a dummy profile generated based on an aggregate of information relating to a particular demographic (e.g., age group, postal code, interest-type), among others. A correspondence between two identity profiles can be established using hashing techniques or tokens such that the underlying actual identity information is never shared.

In some embodiments, a mobile application or portal is provided that provides functionality coupled to both the web interactions as well as the payment operations. The mobile application or portal may both generate information to be provided through the first data set representing intents, as well as the second data set representing outcomes through a combined experience where the user is simultaneously logged into both the first account identity and the second account identity. A feedback loop may established to help train a machine learning model based on tracked intents and actual purchase outcomes.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

An improved platform is described that is adapted to retrieve data related to a user both during internet browsing activities or queries, as well as payment processing. The proposed platform integrates these two data sets to automatically generated estimated data linkages between representations of intent and actual purchase (outcome) behavior. A technical challenge that lies in establishing the data linkages is that there are complex interrelationships between intent data and purchase/outcome data that are difficult to model.

The specific semantics of the intent data (e.g., browsing history, queries) can be extracted and utilized, in some embodiments, to enhance the intent data, and in some embodiments, machine learning and/or reinforcement learning mechanisms are further utilized to tune a model for relating intent data and purchase/outcome data. The semantics of the outcome data (e.g., coupon descriptions, merchant descriptions, SKU item descriptions) can also be utilized to enhance the outcome data. Where both the intent data and the outcome data are enhanced, the accuracy and/or relevance of outputs from the machine learning model can be enhanced, albeit with some performance and storage costs. Applicants have experimented with different text embedding approaches for use as features for a model, or for clustering and semantic searches.

Figure 1:
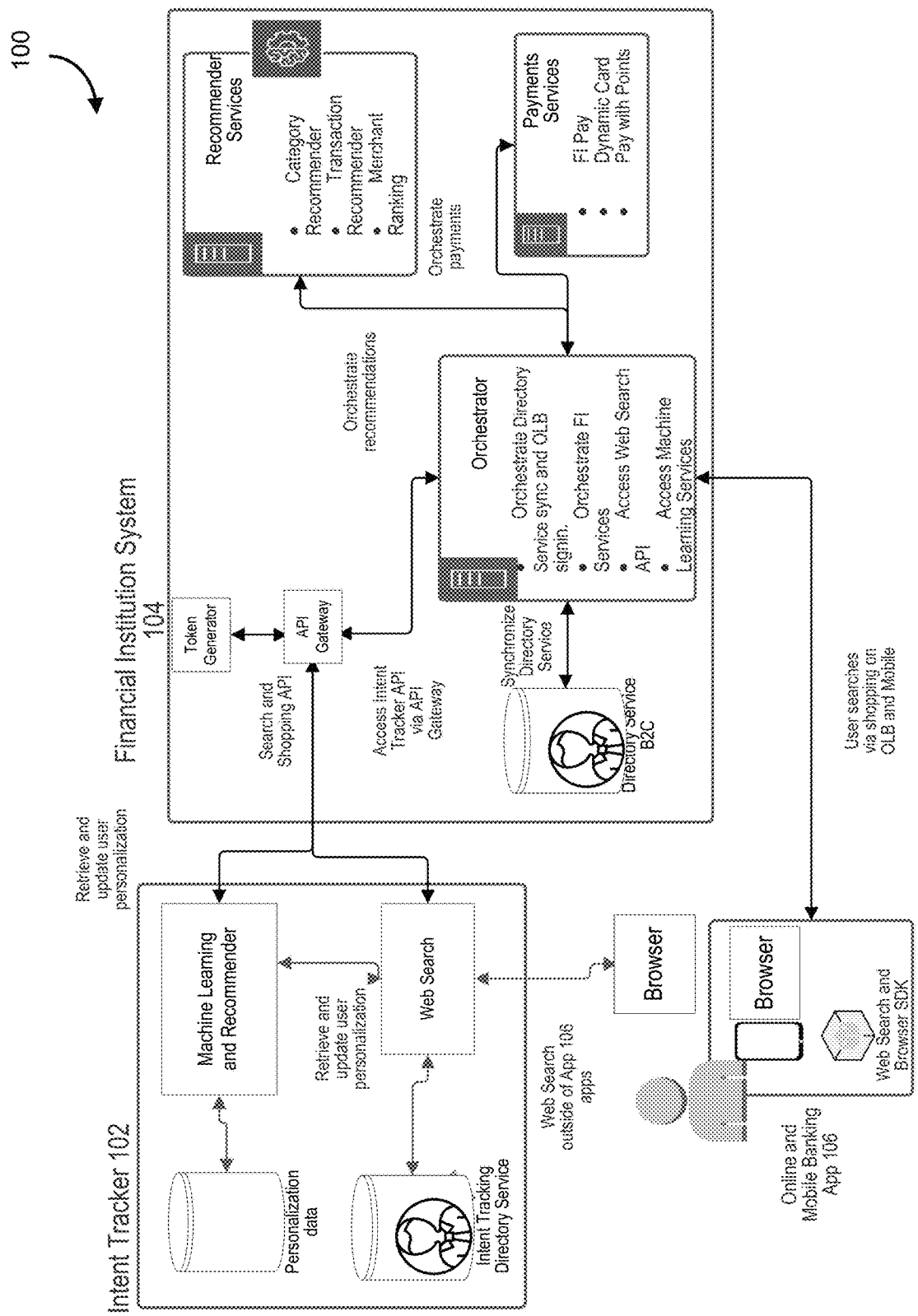
FIG. 1 is a block schematic diagram of an example data process linkage system, according to some embodiments.

FIG. 1 is a block schematic diagram of an example data process linkage system, according to some embodiments. The data process linkage system 100 is adapted for an eCommerce platform having improved capabilities in linking data representations of intents and data representations of outcomes, such that a computer processor can transform data sets representing offers and/or promotions based on tracked data linkages. The system 100 is a network linked system having an intent tracker system 102, a financial institution system 104, and a online and mobile banking application 106, which can be separate computing systems whose operations are orchestrated together by the financial institution system 104. The network can include a local area network, or a wide area network, such as the Internet.

Figure 2A:
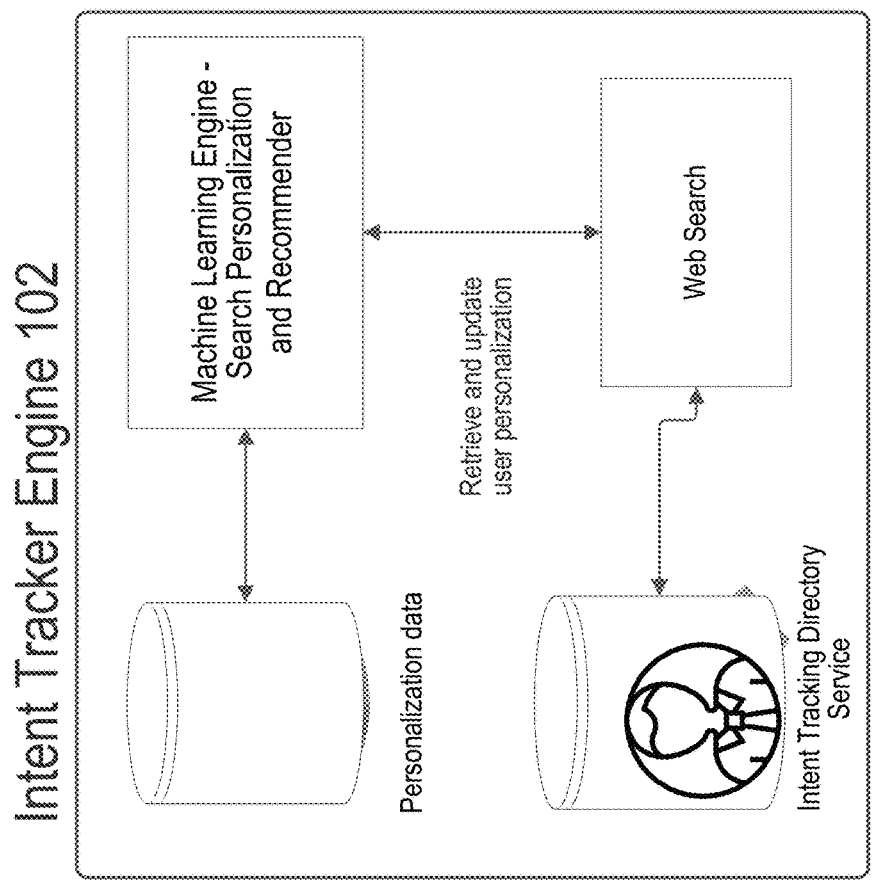
FIGS. 2A-2C are block schematic diagrams showing portions of the data process linkage system in more detail.

An intent tracker system 102, shown in more detail at FIG. 2A, is provided that generates a first data set representative of intents, and this information can be tracked by way of web search query history, internet set browse/traversal history, entered keystrokes, trackable aspects of various eCommerce gateways (e.g., data objects representing specific products/services included in a shopping cart), among others. The user may be able to log in using the user's credentials, and the first data set can thus be associated with the user through, for example, an account associated with a user profile (e.g., stored in an intent tracking active directory).

Web search history can be obtained, for example, through monitoring URL activity or HTTP messaging, such as GET/POST information for variable extraction, among others. Responses from websites can also be processed to obtain this information, for example, responses to queries sent, specific links clicked that indicate a particular browsing path, etc.

In a specific example, web search history can include a search for "best graphics card for playing games", "best graphics card under $1000", "promo code 3080 ti", "3080 ti review", "graphics requirements to play latest flight simulator", and "what is ray tracing". Each of these queries can be tracked as a character string or a set of tokenized words. The user may also be navigating pages, and the navigation through the webpages can be tracked through "a href" links, as well as the response pages through http document structures that can be obtained through a dom tree analysis. The user's navigation (both inputs and http responses) can thus be utilized to add additional intent inputs that can be provided in the form of strings.

For example, navigation inputs can include "in store pick up", "shipping costs", "Waterloo, ON location store hours", "graphics cards", on a retailer site, or for a retailer website, or on a review site "best graphics cards for a budget", "upgrade pick", "budget pick", among others. The navigation inputs can be obtained through the URLs that a user is traversing, or intercepting source http responses and processing them to extract information from header or body portions.

Metadata relating to the sites themselves can also be included as intent inputs, for example, obtained through extracting the domain or IP address that a message is being sent to (www.retailer1.com/q?=graphicscards), among others.

These intent inputs can be characterized as separate inputs and associate with the user through a primary key associated with the user based on the user being logged in to improve relevancy, for example. The primary key may be stored in the user's profile, and can include a user number, user identifier, etc. In some embodiments, the primary key can be changed from time to time to enhance privacy, and the primary key is known only by the user and the user's device, and can for example be stored on a secure partition or other secure computing element such that the primary key cannot be used for other purposes. In some embodiments, the underlying intent inputs are purged after processing for extraction of input features to further enhance user privacy. As described below, in some embodiments, semantic expansion can be used to add additional inputs for machine learning, expanding the set of available features at the cost of performance and storage in the machine learning model that may be maintained over time in the user's profile.

These intent inputs may be semantically enhanced in some embodiments, especially if the amount of intent inputs are limited. Semantic enhancement includes introducing semantic variants to replace and/or augment the intent inputs. For example, a search for "Disney" could include replacing with variants based on the most popular related search terms, such as "Disney vacation", "Orlando travel", as determined based on semantic similarity and/or popularity with other users, for example. In some embodiments, the "tightness" of the semantic expansion (e.g., based on constraining parameters) could be iteratively reduced if not many offers (e.g., less than a pre-defined number) are ultimately surfaced by the system so that the number of offers shown is below a certain amount of offers, to avoid presenting an empty list of offers.

The user's profile may be associated with personalization data, and the intent tracker system 102 may be configured to generate an initial set of offers and/or promotions. The promotion data object can include a prioritized list or an array of potential purchases. For example, a user may be seeking to buy a new computer, and is searching specific components to be purchased separately (e.g., RAM, power supply), in one or more transactions (e.g., at different stores). Offers and promotions can be associated with machine learning/personalization rewards and penalties, and when they are interacted with or selected, an interaction data representation can be obtained for processing potential outcome features for an outcome feature set. The set of outcome features can then be re-processed to tune the linkage representations between the intents and outcomes to update a model representation for the user.

Initially, as the intent tracker system 102 does not have access to outcome information (e.g., whether the user actually went through with a purchase, or purchased through other purchasing portals), the initial set of offers and/or promotions may be poorly tailored, obsolete, or irrelevant (e.g., surfacing a promotion for an item that the user has already purchased in store).

Offers can be presented without an actual query, based on an imputed query based on the user's profile (e.g., estimating a next query based on past queries and outcomes). In another variation, offers can be presented based on a specific query of offers (e.g., the user searches offers relating to "Disney").

The offers can be presented in the form of rendered advertisements, or through other approaches such as a modification in an order of search results to improve relevance to the user's query beyond the word tokens in the query (e.g., using the personalized information from the user's profile). From a computational perspective, the rendered advertisements can be represented using data, variables, and string representations of the advertisements, such that various features of the advertisements are also tracked as features. For example, an advertisement may have associated retailer features (e.g., a stringRetailer, or numberRetailerID), channel features (e.g., isMobile, isDesktop, isInStore), and these features may be provided, for example, in different variable types, such as strings, characters, values, integers, among others. Additional features may include the level of discount (e.g., percentDiscount=5%, 10%, 15%, isBuyOneGetOneFree), the types of products relating to the discount (e.g., electronics, computer), among others.

The offers can be dynamic for each user, for example, based on a targeted audience that is developed for a particular campaign. For audience matching, in some embodiments, aspects of the user's profile can be used to create a tailored selection of users. For example, a campaign may be targeting users who appear to be interested in graphics cards, be in a 20-35 age range, have searched "graphics card reviews", while having profiles linked to their social media services. The audience may be specifically generated for example, to generate maximum word of mouth for a particular product, and this is useful especially where availability of a particular product or service is scarce. The offers can also have dynamic features and characteristics, such as variations on an offer are generated by perturbing various characteristics of the offer (such that a most favorable version of the offer would be presented based on tracked characteristics of the user or past preferences). For example, for a particular user, two for a discount deals are tracked in the user's profile as being of particular interest (e.g., unbeknownst to the system, the user often buys items having such a discount to share with a spouse). Conversely, the user may be single, and the system may be configured to automatically bias away from two for a discount type deals, because the user typically does not have anybody to share the second product with. Rather, for this user, a smaller direct discount may be of more interest. The interest can be computationally represented through the features stored in the user's profile and in the weighted linkages between nodes that represent the linkages between intent features and outcome features.

As outcomes are attained, the linkages and profile representations are updated and refined such that, in this example, the profile representation begins automatically favoring a type of offer or coupon. A benefit of using semantic tokenization of query and navigation intent features is that the system is now able to automatically capture additional non-linear and non-direct relationships that would otherwise be difficult for a retailer to tune for. For example, a particular user may conduct a large amount of research on large, expensive purchases, conducting significant price comparisons and reading reviews, and the user profile, through intent information may be adapted to automatically recognize this behavior. Accordingly, in this example, whenever a large amount of research is done, the user is very price conscious, offers that will be surfaced by the system 102 may include only offers having a particular level of discount On the other hand, for the same user, whenever the user does not conduct a large amount of research, the profile may indicate a preference towards free or expedited shipping (e.g., increased convenience), and offers and coupons can be tuned or selected to emphasize convenience related options.

In some embodiments, the intent tracker system 102 securely interoperates with a trusted execution environment (e.g., a "virtual clean room"), where the first data set representative of intent-based interactions with the eCommerce web pages associated with a specific user is loaded along with a set of privacy related information that can be used for securing the first data set.

In an example, the trusted execution environment may be configured such that the information stored thereon is not accessible external to the trusted execution environment, and the trusted execution environment may receive or be loaded with one or more encryption keys associated with the user such that the user is able to control an amount of access or a query level associated with the first data set by, in some embodiments, providing a privacy preference setting information data object to the data custodian of the trusted execution environment, or in other embodiments, providing a specific encryption key that allows the trusted execution environment to access the loaded data only to a particular level of permissions (e.g., only aggregated information, only certain fields).

Figure 2B:
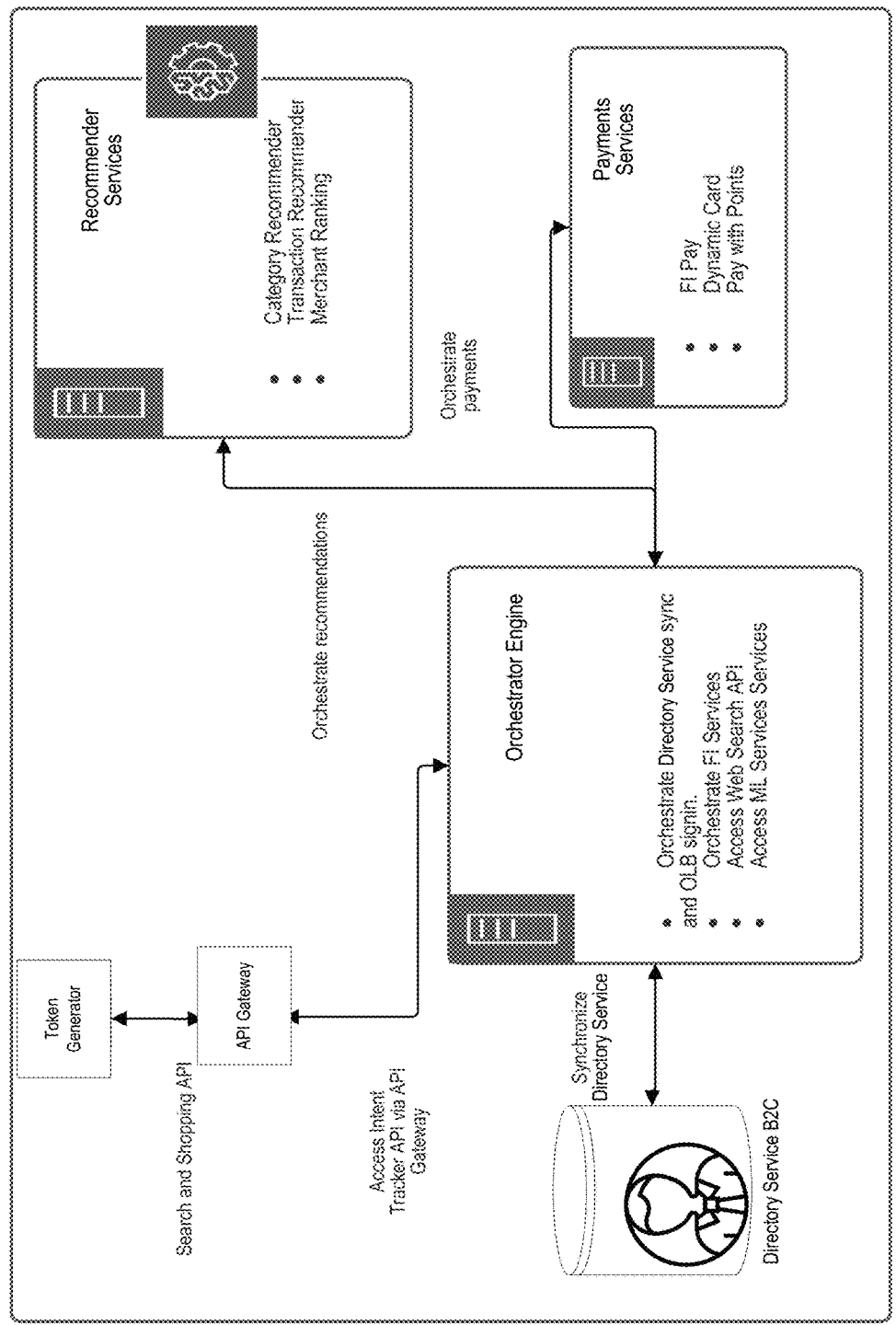
Figure 2C:
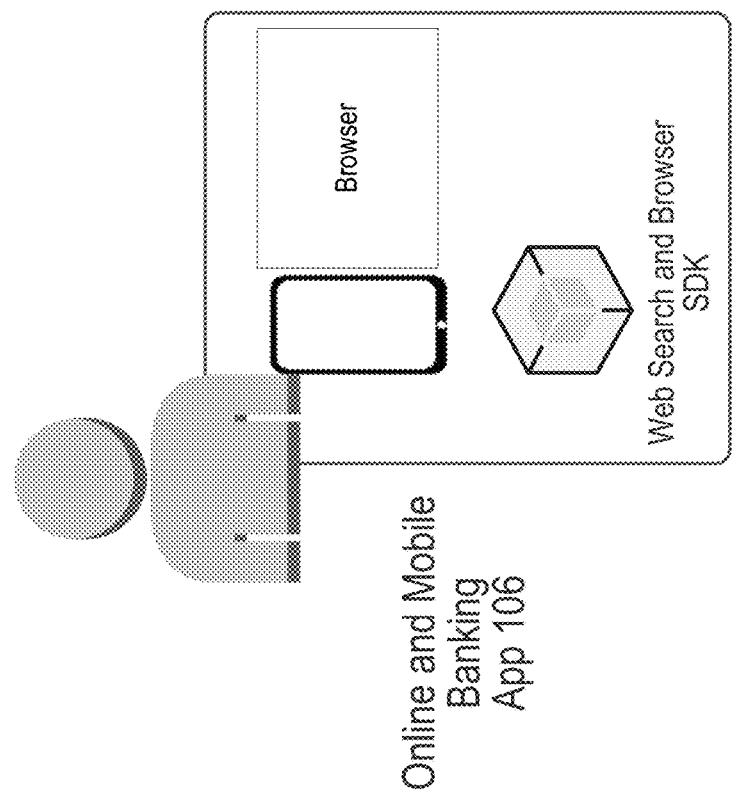

The system 100 provides an architecture having a data processing orchestrator device or service provided by financial institution system 104 (shown in more detail at FIG. 2B) which securely interoperates with data sets at various points in time associated with a set of eCommerce interactions a user may have with computer systems. The data sets are obtained from different data repositories, and are combined together for analysis such that the first data set representing intents (e.g., web search/browse history) can be combined together with a second data set representing outcomes (e.g., purchase transaction history, web site shopping carts).

The second data set can be obtained, for example, from payment processor engines, and tracks the actual outcomes of various transactions to determine whether they were consummated or not, and what coupons or offers were applied. The second data set can be obtained having differing levels of transaction specificity. For example, in some embodiments, the second data set only has a user identifier along with an aggregate amount spent on a particular transaction at a given time for a merchant or vendor. The second data set in this example, may be limited such that it does not have SKU level information. In this example, the system 104 may be configured to take additional steps in creating linkages to estimate SKU level information. In another example, the second data set can be obtained having SKU level information readily available such that individual products and services associated with the transactions can be identified.

Linkages can be established, for example, based on temporal proximity to a purchase, whether the purchase was conducted in a same window or sessional instance, whether the purchase was related to a particular semantic string identified in the recent intent tracking input elements, and the initial strength (e.g., weighting) of a linkage can be modified based on how confident/how close the outcome is relative to the intent. For example, it could be based on temporal proximity (e.g., all purchases in the past five minutes is given a score of 1, half an hour is given a score of 0.8, day is given a score of 0.5, and in the last week would be given a score of 0.2. In some embodiments, all intent features and all outcome features being tracked have an initial score of 0.0, and are updated over time as outcomes are tracked. The linkage model can then be utilized for offer/coupon generation, and in some embodiments, the system 104 is designed to maximize outcome scores when promoting new offers and coupons to the user (indicative of increased convenience or relevance to the user).

Outcomes can be tracked and associated with profile re-tuning machine learning rewards or penalties such that the outcomes can be used in a form of a reinforcement learning engine, where an agent is maintained based on world interactions (e.g., the user's interactions with real-world websites), the machine learning model acting as an agent designed to optimize a particular outcome through determining which users should be eligible for a particular offer or coupon. As described in various embodiments below, the relationships between particular offers and coupons with one another or with merchants can also be maintained and tracked over a period of time to computationally understand or represent which merchants or coupons are related to one another (e.g., coupon to coupon or merchant to merchant). Semantic search capabilities can then be used to expand the available set of training outcomes or offer/coupon options by computationally estimating relations between merchants and coupons, or between coupon/coupon, for example.

The financial institution system 104 can interoperate with a token generator to create and manage tokens linking the transactions to specific account identifiers for one or more users. This provides a layer of security abstraction as it may be paramount to maintain the security and privacy of the account identifiers and the linkages thereof. For example, the account identifiers can be replaced for each user with a substitute token or user identifier that can be a token that is managed by the token generator (e.g., periodically refreshed or updated). The information generated by financial institution system 104 can also be loaded into the trusted execution environment such that privacy levels and access levels can be controlled.

The financial institution system 104 can include an orchestration engine that is configured to retrieve the first data set and the second data set, or modified versions thereof if specific privacy settings are enabled. The financial institution system 104 is configured to generate data linkages between the first data set and the second data set such that intent data and outcome data can be combined together to generate improved insights. The orchestration engine uses the data linkages as a trained model for receiving and inferring output features such as a next best merchant, a next best price, among others, and interrelations between coupons and coupons, and between merchant and coupons.

As noted above, the data linkages include whether a particular transaction was consummated after research, and in some embodiments, intent tracking or estimation engines are also utilized to generate computer estimated intentions from the first data set, both at a transaction level (e.g., John is trying to buy a computer fan able to power a 500 W power supply) and at a thematic level (e.g., John is building a computer capable of playing the latest AAA video game), and these intents are matched against the purchase outcomes associated with the user.

The orchestration engine is configured to transform, based on the one or more data linkages, a set of offer parameters or offer selections for a target user such that the offer parameters or offer selections can be tailored specifically for that user. For example, an estimation may indicate that the user is still looking to buy a power supply but the right price has not yet been achieved, and in an attempt to finalize the sale at an acceptable price, the offer may be transformed such that the price now fits within the range suitable for the user's needs, albeit being a refurbished model or used model.

The orchestration engine controls the rendering, on a display of a computing device utilized by the target user in interacting with a web page of the one or more webpages, a visual display element representative of the transformed set of offer parameters or offer selections for the target user.

Figure 3:
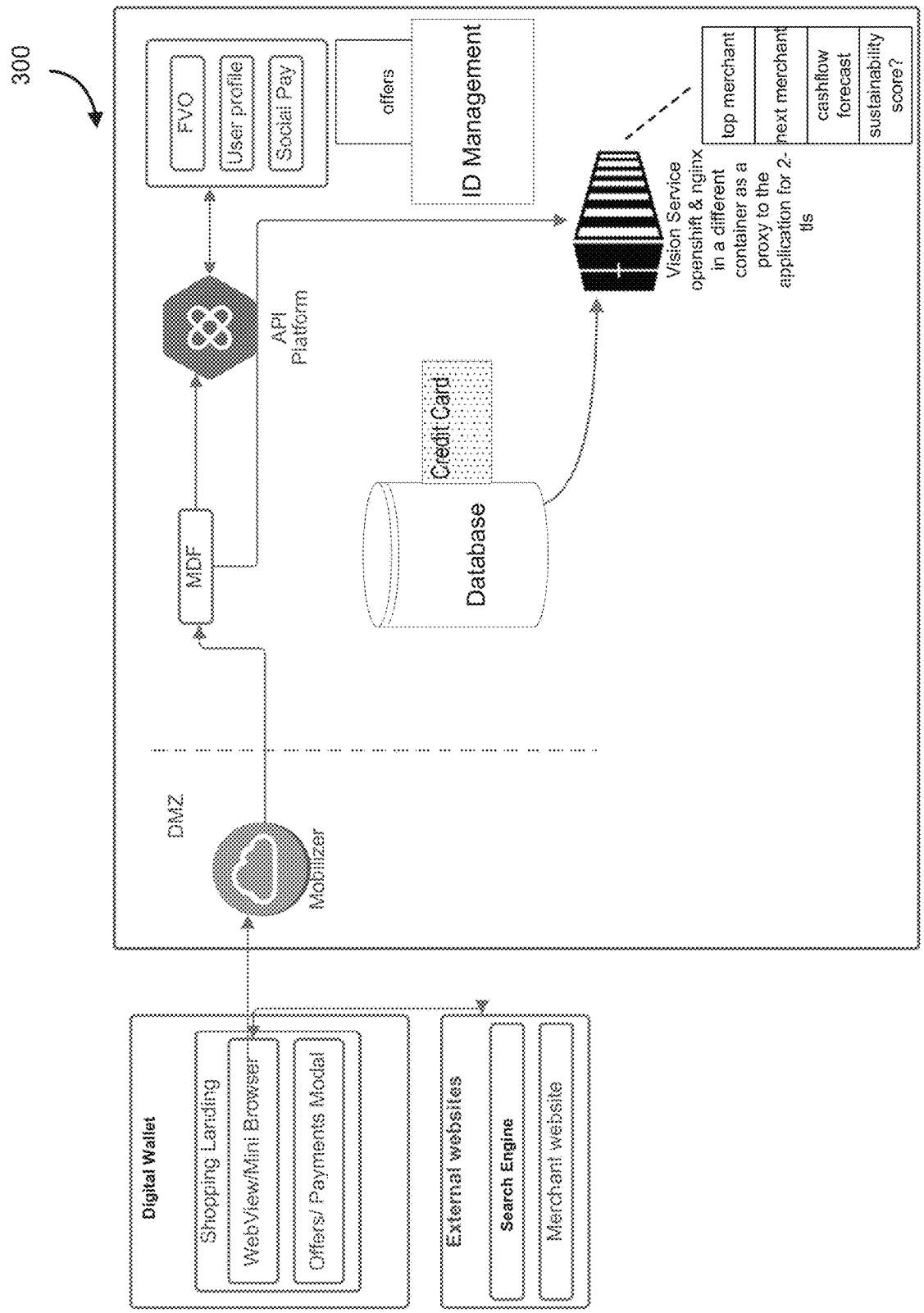
FIG. 3 is an example schematic of a data flow diagram for the orchestration engine, according to some embodiments.

FIG. 3 is an example schematic of a data flow diagram 300 for the orchestration engine, according to some embodiments. In FIG. 3, payment information can be obtained, for example, from a mobile wallet application, and intent information (e.g., search queries, internet browsing history), can be obtained from various external websites. The data can be stored in a database data source.

Figure 4:
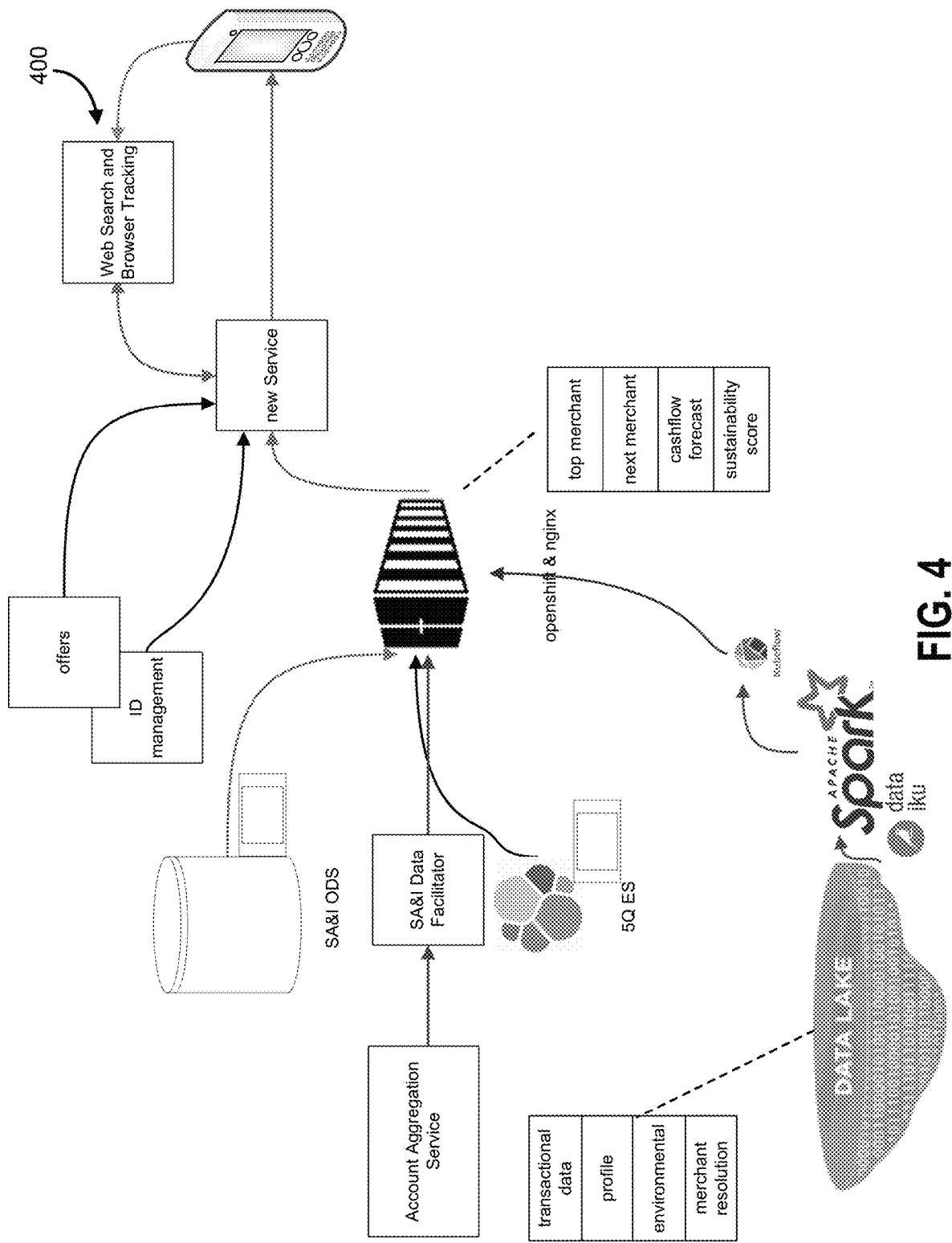
FIG. 4 is an example schematic of a computing architecture for the orchestration engine, according to some embodiments.

FIG. 4 is an example schematic of a computing architecture 400 for the orchestration engine, according to some embodiments. In FIG. 4, the first data set and the second data set may be stored in the data lake, which is a data warehouse adapted to expose certain data to the orchestrator engine.

Figure 5:
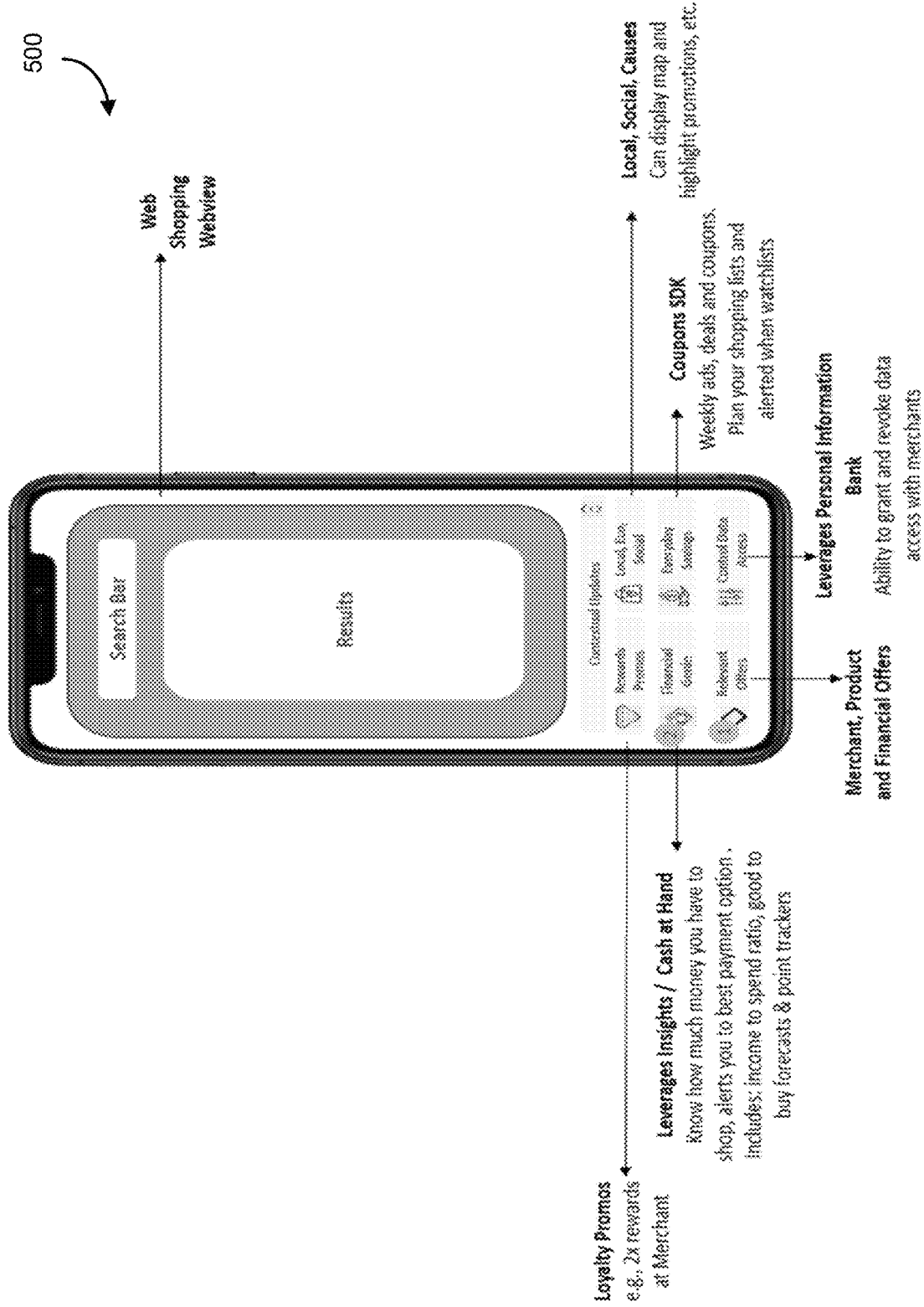
FIG. 5 is an example rendering of an improved display having a combination of a web shopping webview augmented with visual interface elements based on the data linkages, according to some embodiments.

FIG. 5 is an example rendering 500 of an improved display having a combination of a web shopping webview augmented with visual interface elements based on the data linkages. In some embodiments, the web search experience itself is augmented based on the data linkages, and in further embodiments, the contextual information added onto the interface (for example, as a widget bar) surface additional information elements, such as showing insights, personalized offers, among others.

The improved display can include one or more sliders or controls adapted to modify privacy settings, which, for example, can modify how information can be retrieved from a trusted execution environment. In this example, the user's mobile device may store one or more keys that can be provided to the trusted execution environment to modify the types and amount of data to be obtained from the trusted execution environment for use in establishing linkages between intents and outcome data representations.

Figure 6:
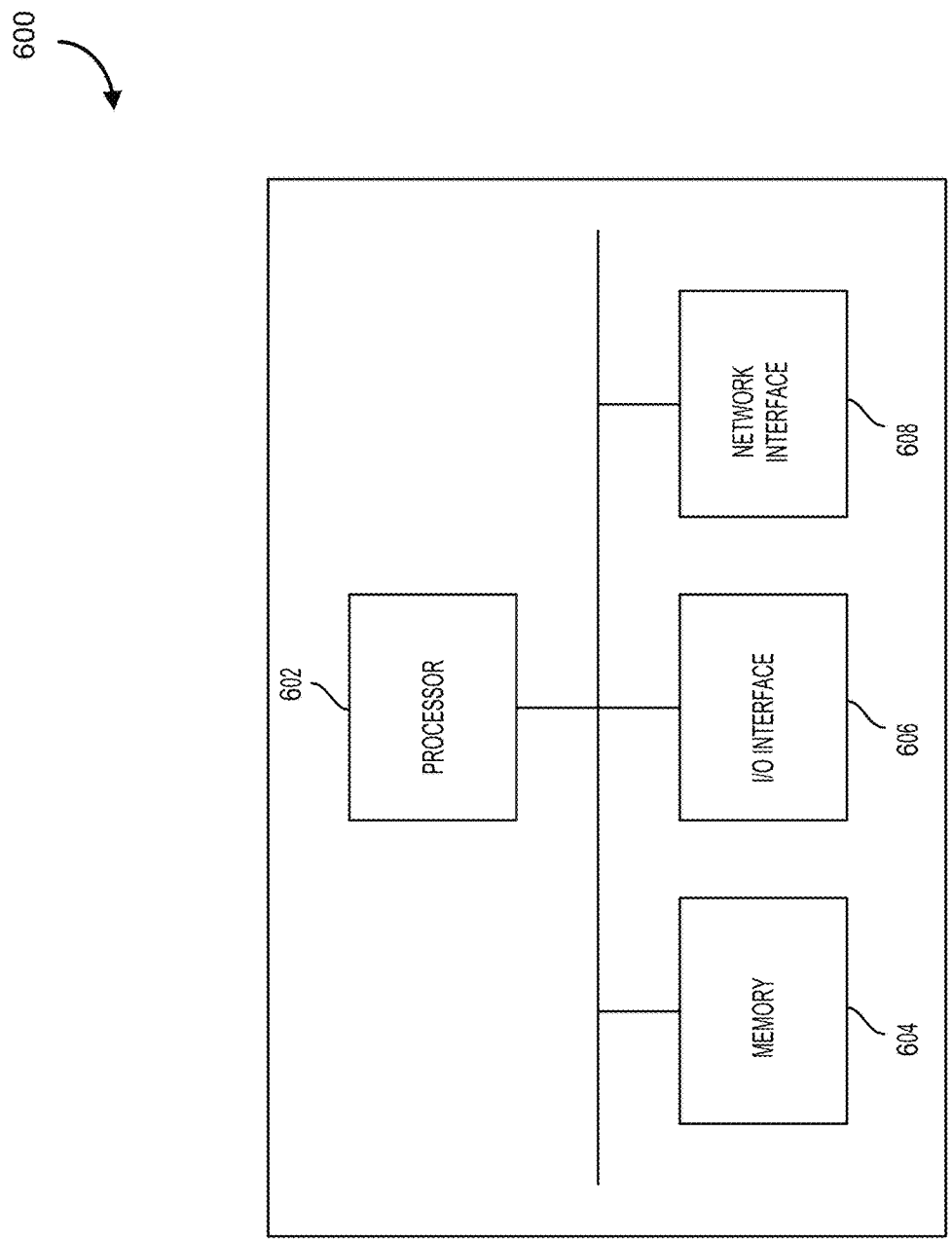
FIG. 6 is an example schematic of a computing system or device that can be utilized in implementing the data process linkage system, according to some embodiments.

FIG. 6 is an example schematic of a computing system 600 or device that can be utilized in implementing the data process linkage system, according to some embodiments. Processor 602 can include computer microprocessors, field programmable gate arrays, or processor chips, and the system 600 can include a desktop computer or a computer server or computing appliance. Memory 604 can include various types of read only memory, random access memory, among others, and the system 600 may be configured for receiving user inputs through input/output interface 606, communicating with other devices through a network interface 608 through the Internet, an intranet, or other types of local and wide area networks.

Figure 7:
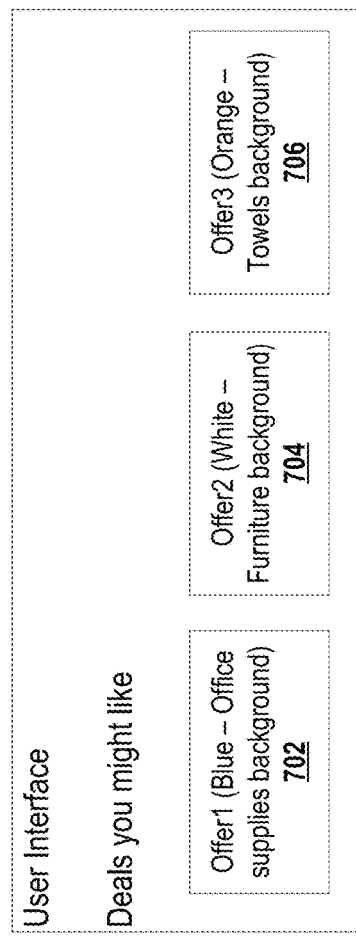
FIG. 7 is an example rendering of deals that may be presented on a user interface, according to some embodiments.

FIG. 7 is an example rendering of deals that may be presented on a user interface, according to some embodiments. In FIG. 7, a user interface 700 is shown where there, for example, a number of different deals are presented in the form of interactive visual interface controls. These are presented as different options, for example for supporting a reinforcement learning approach based on a multi-armed bandit model, which in this case can be applied at an actual coupon level (or a merchant level). Three example offers are shown as offers 702, 704, and 706.

From a computational perspective, the offers are represented in the form of Offer 1(10% off, Merchant1, electronics, office background, blue, size=0.9); Offer 2: (BuyOneGetOne50% off, Merchant2, furniture/home décor, furniture background, white, size=0.4), Offer 3: (5% off and free shipping, Merchant 3, bath supplies, towels background, white, size=1). In the multi-armed bandit approach, the system is used to feed back information indicating which offer was selected and which were not for use in re-training the system or varying linkage connection weights, according to some embodiments. The offers are not only tracked from an offer type perspective, but in some embodiments, additional features are tracked also in respect of the visual rendering of the offers themselves (color, size, among others).

As described, the offer can thus be provided in an offer recommender engine that recommends coupons and other user behaviours that can be tracked in relation to an interaction include (number of transactions, clicks, recent searches, next best merchant), and coupon information (e.g., category, colours used in image, description text).

The offer recommender engine can be configured to provide the following input data set:

Coupon data: the information about the coupon based on merchant and category or product level.

Contextual data: Data contains user demographic/geographic data, purchase history, their spending on merchant or product category, frequency of a purchase per merchant/per product category, day of the purchase, frequent buyer, revenue generator (75% percentile or above or some other condition)

Recommendation list: coupons per merchant or coupons per product category, coupons per product Reward list: coupon values or some other values (can be based on preference)

The offer recommender engine can output an offer recommendation, which can be provided, for example, in the form of a normalized or raw score that can be used to rank which offers would be shown for the multi-armed bandit (e.g., surface the top 3 offers). Accordingly, over time, as different offers are shown, the multi-armed bandit model can be used to tune the offers with an aim to optimize acceptance of a particular offer being shown.

The offer recommender engine is an improvement over traditional systems, as it can be configured to automatically handle a constantly changing nature of coupons, and vary for shopping choices that change over time for various reasons, such as seasons, time, changes in life situation, etc. The approach can also be used to address cold start problems by generating recommendations for a user based on demographically available or similar users to establish recommendations for a new user when the system does not yet have sufficient in their user profile. In some embodiments, the improved offer recommender engine is also capable of implementing logic to influence the recommendations and to tailor recommendations to improve an outcome. For example, a system could be configured to dynamically alter a recommendation based on a provided range (e.g., the system may be provided discretion to provide the user between 5 to 15% discount, but instructed to remain close to 5% when possible). Based on the input features and linkages, the system may indicate that for a particularly price conscious purchaser, there is very low confidence in a purchase at 5%, but very high confidence in a purchase at 10% discount, and in this situation, the improved offer recommender engine can tune the offer to provide a 10% discount.

Figure 8:
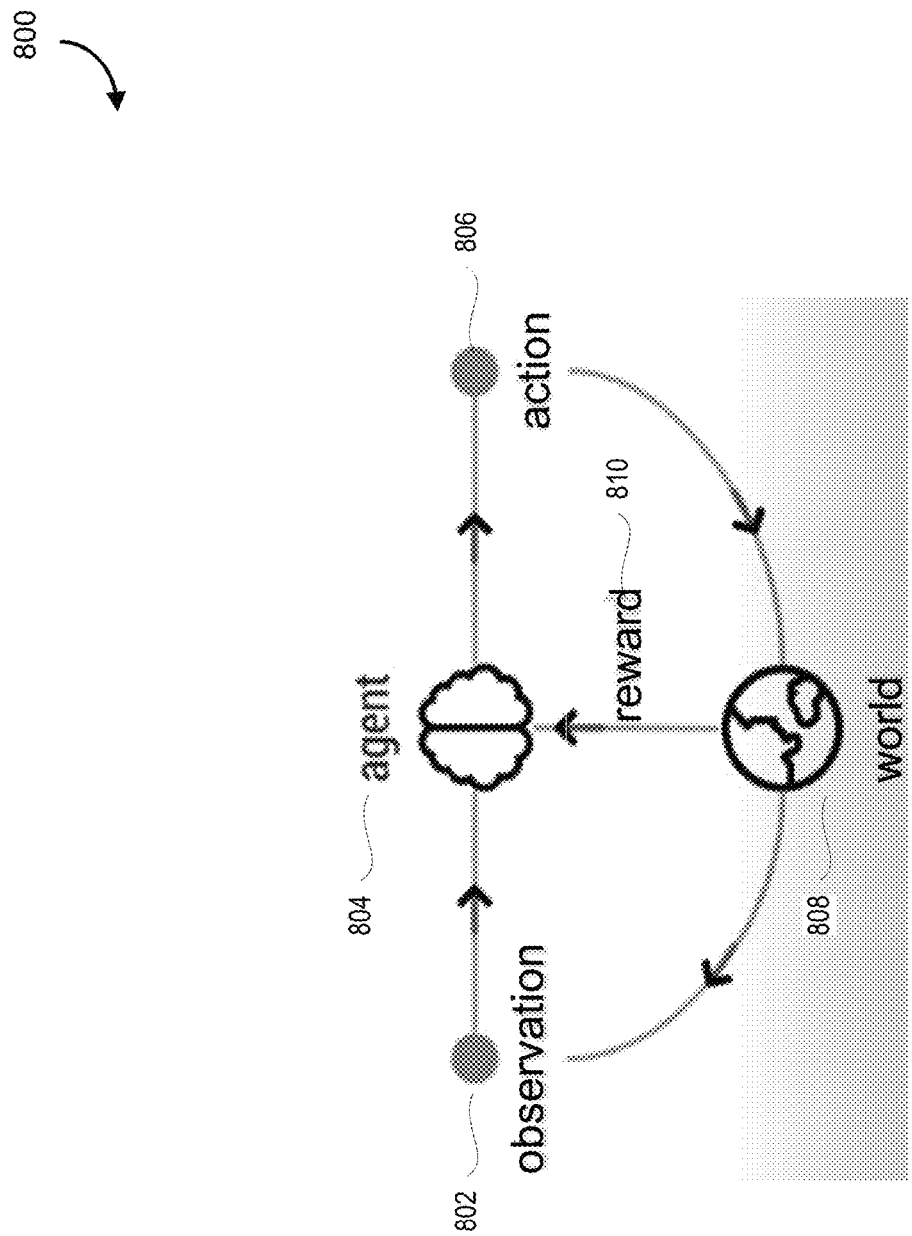
FIG. 8 is an example schematic of a reinforcement learning model, according to some embodiments.

FIG. 8 is an example schematic of a reinforcement learning model, according to some embodiments.

In this example 800, an example reinforcement learning model approach is shown, using a Multi Armed Bandit (MAB) approach based on actions and rewards. As an experiment, Applicants have proposed a modified version of MAB to predict the merchant based on a stimulated contextual data using MABWISER, a python based library for MAB.

In the proposed MAB approach, the system first includes instantiating a machine learning model data architecture adapted for reinforcement learning. At 802, the approach includes obtaining observations (e.g., based on selecting of an offer among a plurality of offers, and an agent 804 (a mechanism that acts based on the machine learning model data architecture) is trained based on actions 806 taken by a user (e.g., selecting an offer, interacting with an offer, clicking on an offer), which are observed in the "world"/ecosystem at 808. The selected offer is rewarded at 810 or conversely, the non-selected offers are penalized at 810, or both.

The machine learning model data architecture including one or more weighed interconnections between nodes representing the first data set, the second data set, and the set of offer parameters. In another embodiment, the nodes also include representations based on the tracked data linkages between the first data set and the second data set.

The machine learning model data architecture represents a latent space through the weighted interconnections, and can include a neural network. Over time, the machine learning model data architecture is trained based on user selections of offer parameters leading to positive out-come based interactions in the second data set representative of outcomes. The approach is adapted for use with offer and coupon generation, where a model will be trained on user contexts, coupons, and rewards, coupons can be recommended, and based on a user's reaction to the recommendation (e.g. save, click), the model is assigned the rewards/penalty.

The agent 804, using the machine learning model data architecture, identifies offers to be presented to the user, and in some embodiments, automatically selects and presents a plurality of offers to be used to obtain information through the user's selections. The transforming of the set of offer parameters or offer selections for the target user can include selecting one or more offers for the user based at least on an output value generated by the trained machine learning model data architecture, such that the machine learning model data architecture indicates what offers to show.

A plurality of offers are selected for the user to be rendered on the display of the computing device, and in a multi-armed bandit approach, the model obtains information by utilizing the set of offers as a set of multi-armed bandit training inputs for the machine learning model data architecture.

Each of the offers is distinguished from one another through their individual characteristics, and vary from one another, and these can be represented as individual features in the machine learning model data architecture. The closer the offers are to one another, the more information about preferences can be automatically gleaned.

For example, if there are three offers presented, all of which relate to the same product that the user is keen to purchase, but have differences in coupon discount amount, shipping costs, add-on items, the system will obtain more information about the specific preference of the user. For example, the user may be single and volume discounts may be of less importance, while free or expedited shipping may be of more importance. The offers can be presented on a display of a computing device, for example, as side by side offers. The offers can also have parameters that vary for the multi-armed bandit that are not directly relating to offer characteristics, but rather relate to how the offer is shown or rendered (color, size, animations, positioning) in the user interface. Similarly, other parameters can include swapping out the specific product for a competitor product to assess the user's level of preference for store-brands as compared to name brands, etc., and a willingness for substitution.

Accordingly, the multi-armed bandit approach is not only a useful way to improve the relevance of offers, but in some embodiments, the selections from the multi-armed bandit approach form part of the second set of outcome information, and the corresponding data linkages between intent and outcomes can be further automatically updated to bias towards this interconnection (e.g., user searches shipping costs often, and outcomes are more positive when shipping is free, even for a economically equivalent discount, potentially due to psychological reasons).

The model is then updated using the new information about reaction to coupon their rewards, and based on new updated model, recommendations will be made.

Accordingly, the rewards and penalties are used to help the model adapt to the dynamic environment (user choices or coupons).

Example hyper parameters for MABWISER model:
Learning policies such as Epsilon greedy, Upper Confidence Bound, Thompson Sampling, etc. helps the model maximize its gains by optimizing the balance between exploration phase and exploitation phase.
Neighboring policy such as K-mean neighbour, mini-batch-K-means, Locality-sensitive Hashing nearest neighbor, and Radius helps model to cluster the data for better prediction.

The offer recommender can be built based on a contextual Multi-Armed Bandit approach, where apart from decision (arms) and rewards, the system takes contexts such as any information about user or product into account.

There are three types of features that can be provided:
1. Decision: coupons to offer
2. Reward: revenue generated
3. Context:
   Coupon text embeddings
   Merchant's logo embeddings
   Weekday/weekend
   Average spend by user weekly
   Holiday
   Coupon image embeddings
   Time of the day
   Clicks
   Saved to the wallet
   Transaction rate A base model for offer recommender can be created using coupon text embeddings and merchant's logo, embeddings which both have their use cases as described below.

For text embedding, Applicants have experimented with many embedding algorithms such as TFIDF, Word2Vec, Doc2vec, and Bert based sentence transformers (SBert). In particular, Applicants have used Sentence Transformer ('all-MiniLM-L6-v2') which is based on pretrained nreimers/MiniLM-L6-H384—uncased and further fine tuned in on 1 B sentence pairs dataset which maps sentence to a 384-dimensional dense vector space. Apart from being used as features for a model, these text embeddings have many use cases such as clustering or semantic search. These approaches can be used to enhance the available semantic variants for replacement or augmentation of various terms.

Figure 9:
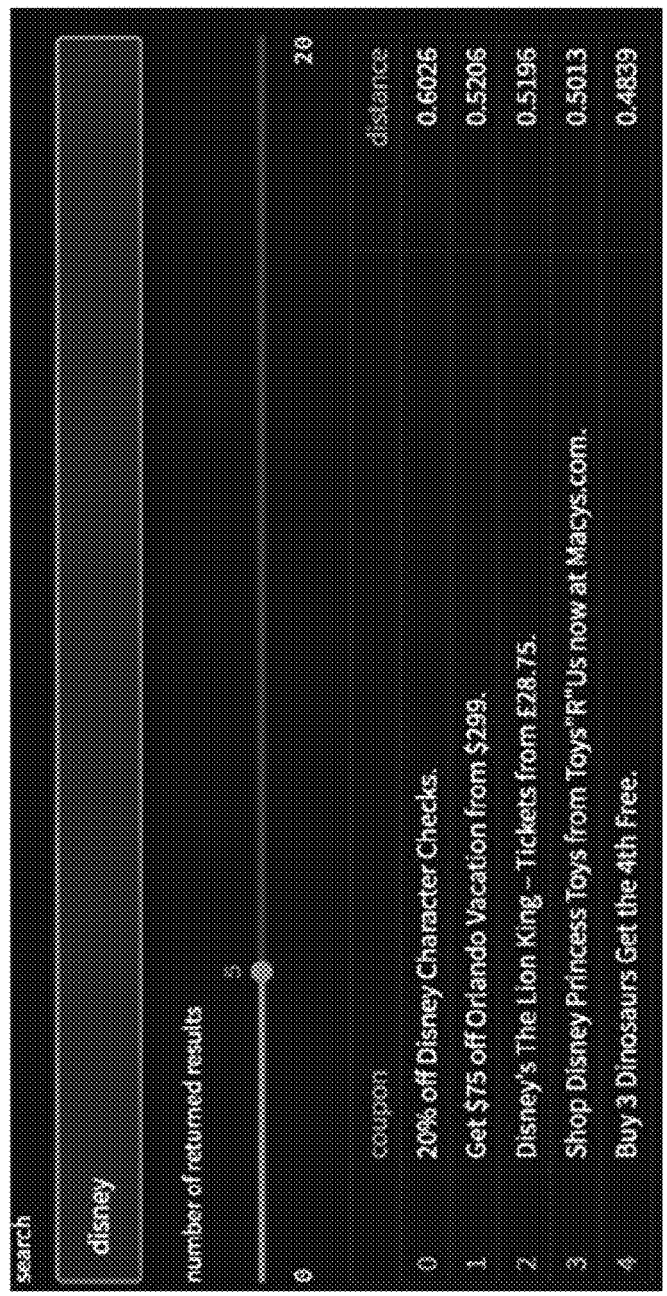
FIG. 9 is an example rendering of clustered search results for a semantic search, according to some embodiments.

FIG. 9 is an example rendering of clustered search results for a semantic search, according to some embodiments.

In this example 900, coupon text embeddings can be grouped together to provide clusters of similar items based on cosine similarity metric, or based on outputs from a machine learning model optimized for positive purchase outcomes, or a combination thereof (e.g., the model output could be used to weight the cosine similarity metric).

Semantic searches can be utilized to expand a set of results. For example, the system is tasked with finding a coupon for "Disney" then it will find the deals not only related to word Disney, but also deals associated with Orlando, Disney's products (toys, movies, etc.) with its cosine similarity score. Semantic enhancement approaches can be used to expand search queries in some embodiments, for example, by replacing search terms with semantic variants.

Either the search term itself or semantic variants can be used (either individually or in concert), and semantic distances can be established for various available offers, as shown in the distance column in the diagram of FIG. 9.

In FIG. 9, a number of coupons representing offers are shown (coupons 0-4), having specific textual descriptions and a distance. The distance, for example, can be used to establish the specific semantic distance from a particular query or semantic variants by the user. For example, the first offer has a direct match, while the second offer shown matches a semantic variant (Orlando vacation). As a number of returned results is changed on a slider, more distant results can be shown in the set of offers.

The offers can also be grouped together and interrelated using various types of graph data structures, which can be generated using network analysis. The interconnections for the network analysis can be established using semantic analysis similar to the semantic search used to generate variants. For example, the interconnections could be established based on semantic distances from offer to offer, for example. As such, network analysis can be used for semantic search, by using semantic search to further extend to create a network of coupon-coupon, coupon-merchant, or both. These networks can be further used to build recommendation systems or community detection, or clustering as well.

Figure 10:
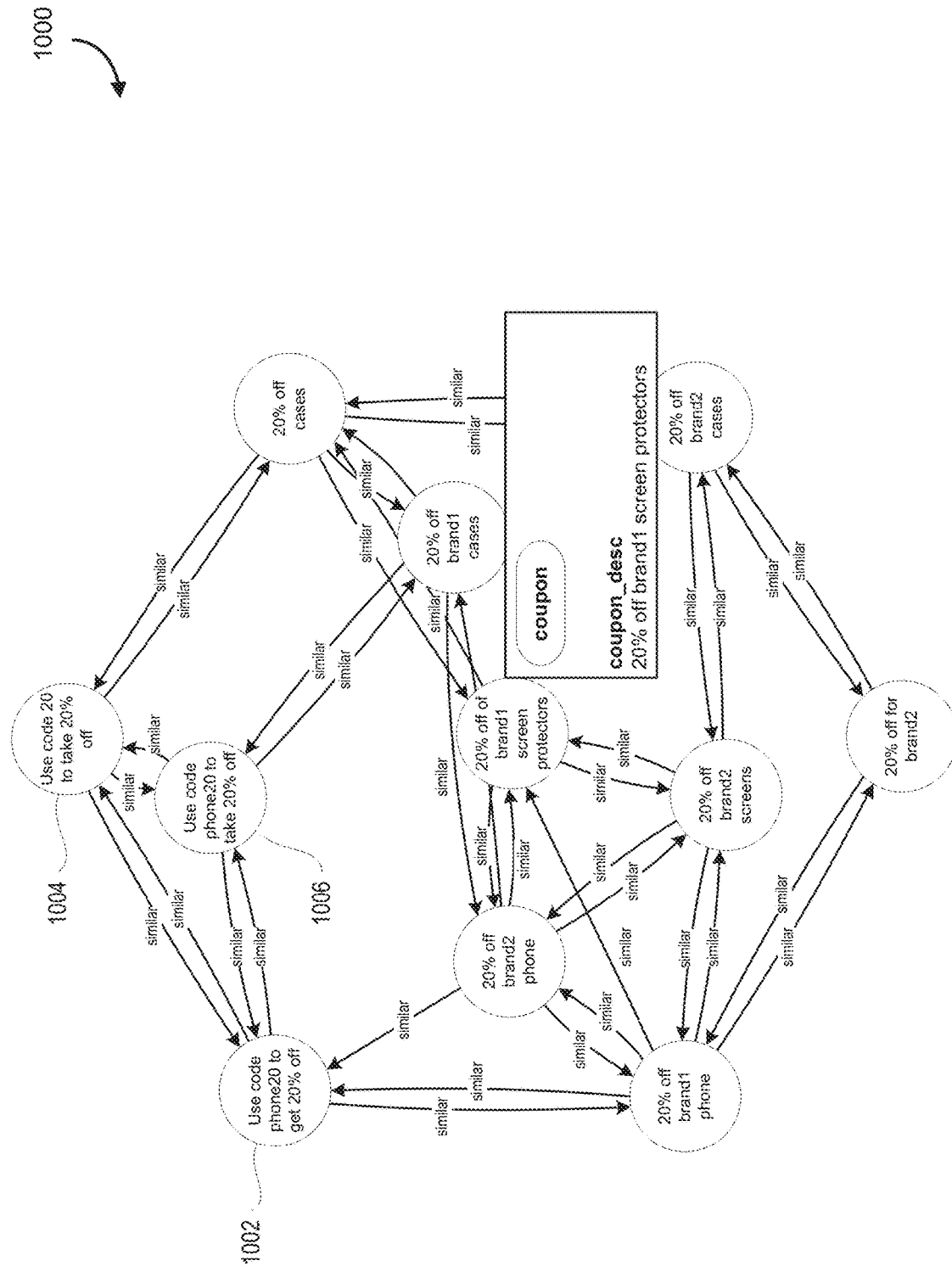
FIG. 10 is an example rendering of a data representation of coupon to coupon network, according to some embodiments.
Figure 11:
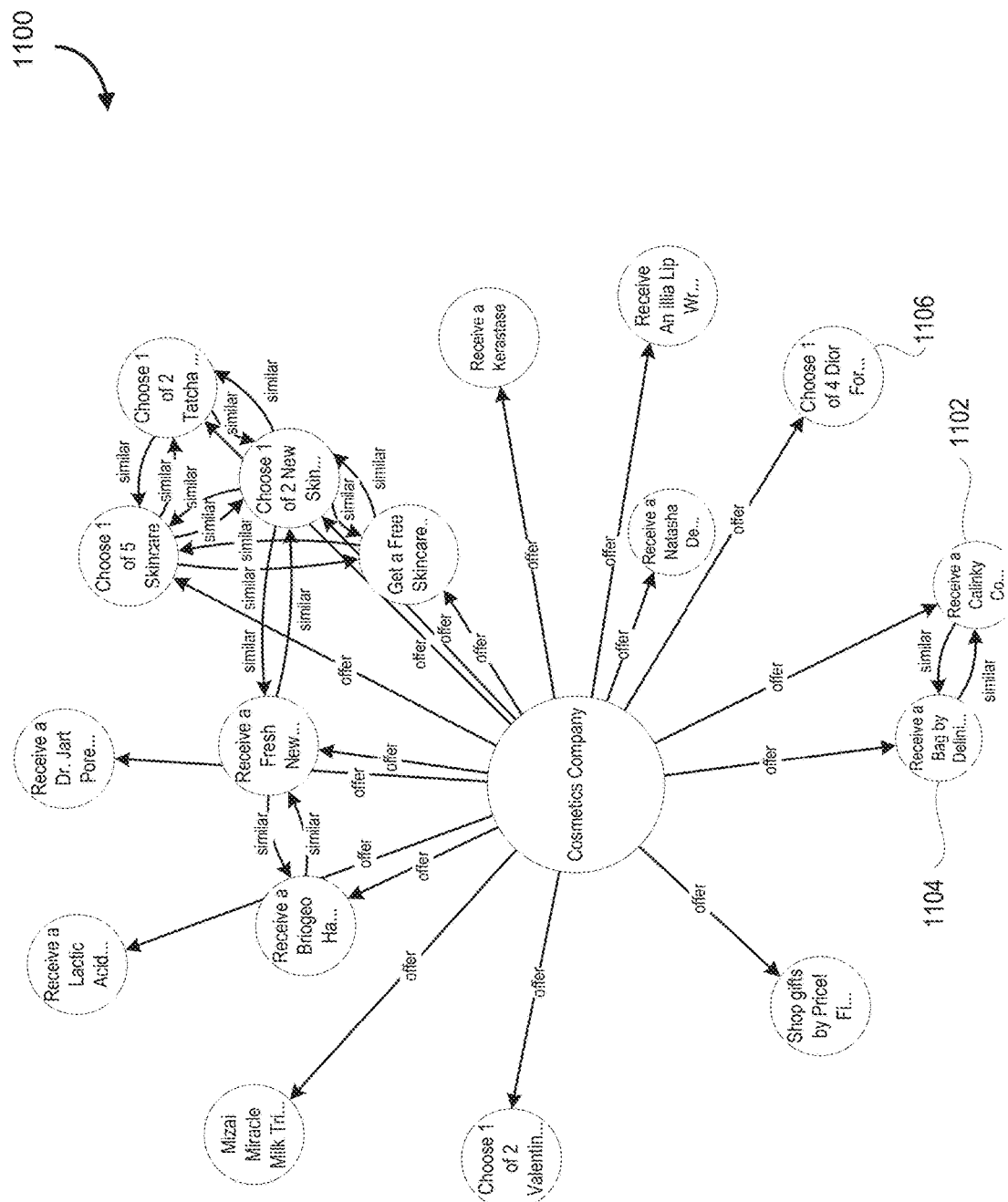
FIG. 11 is an example rendering of a data representation of merchant to coupon network, according to some embodiments.

For this, Applicants created a data frame of the top 5 similar offer/coupon for each given offer/coupon. Using the coupons as node and edges if they are semantically similar, the system generates a coupon-coupon network, as shown in an example 1000 in FIG. 10. Furthermore, merchants can also be added as nodes, and edges between the merchant and the coupon can be established if the merchant offers that coupon. This example is shown in example 1100 in FIG. 11.

The graph networks can be used to modify the MAB selections, in some embodiments. In particular, while the MAB selections can be based on a simple ranking of relevancy scores relative to the user's query (imputed or explicit), in another variation, the graph networks are utilized together with the relevancy scores relative to the user's query. In a first variation, a most relevant offer is first selected based on the semantic distance (e.g., the offer having the highest semantic distance score). In some embodiments, the semantic distance scores are modified or determined further based on a machine learning model tracked representations of the user through the intent data sets, the outcome data sets, and/or prior offer selections.

After the most relevant offer is selected, the additional offers for the MAB are selected using the graph network instead in this variant. The graph network is interrogated for closest neighbors. For example a particular offer is selected in FIG. 10.

The corresponding node is identified, in this example, the node 1002, and node 1002 would be the first offer. After that node is selected, the graph network is then interrogated to identify nodes 1004 and 1006, the two neighbor nodes that have the highest semantic similarity score to node 1002. For the MAB reinforcement learning process, the offers of nodes 1002, 1004, and 1006 are presented. This approach is useful because it picks nodes with minor differences such that these differences can then be used for obtaining very specific information through the MAB reinforcement learning process, improving the representation of the user.

In another variation, a hybrid approach can be used. Observing FIG. 11, node 1102 is chosen. In selecting another offer for the MAB approach, its neighbor 1104 is selected. However, no neighbors remain, and then 1106 is selected based on having the next highest relevancy score to the original query.

Figure 12:
FIG. 12 is an example rendering of a next merchant display rendering, according to some embodiments.

FIG. 12 is an example rendering of a next merchant display rendering, according to some embodiments. In this example 1200, four offers are shown that have been selected for the user based on the user's search history.

In this example, using the most recent searches per user, the system can be utilized to run the semantic search API for relevant offers, and the search could be a real-time match based on relevancy and/or a multi-armed bandit selection. Search history retention policies can be established based on a minimum number of searches and time elapsed sine the search.

Figure 13:
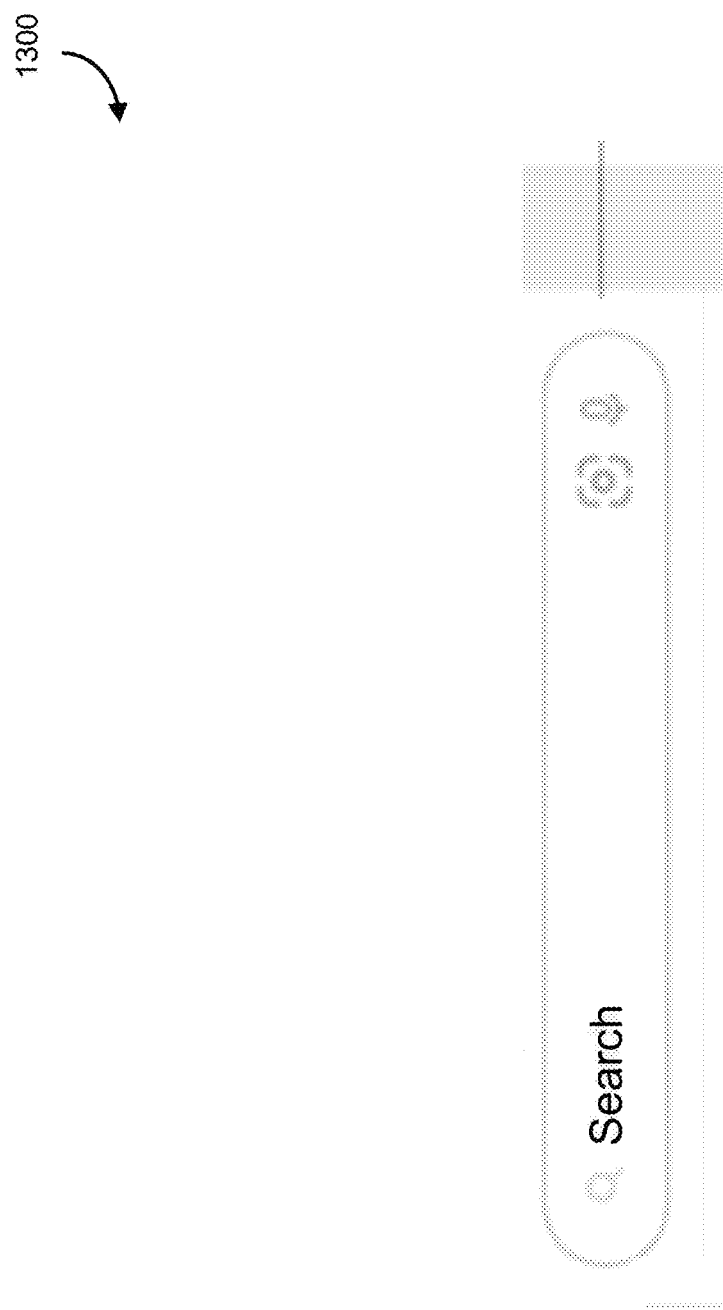
FIG. 13 is an example rendering of a search bar, according to some embodiments.

FIG. 13 is an example rendering of a search bar, according to some embodiments. Search bar 1300 may be utilized to enter a specific query, for example, querying available offers or generating a search query as part of a web search. The search query could be tokenized and broken into word tokens for analysis.

Figure 14:
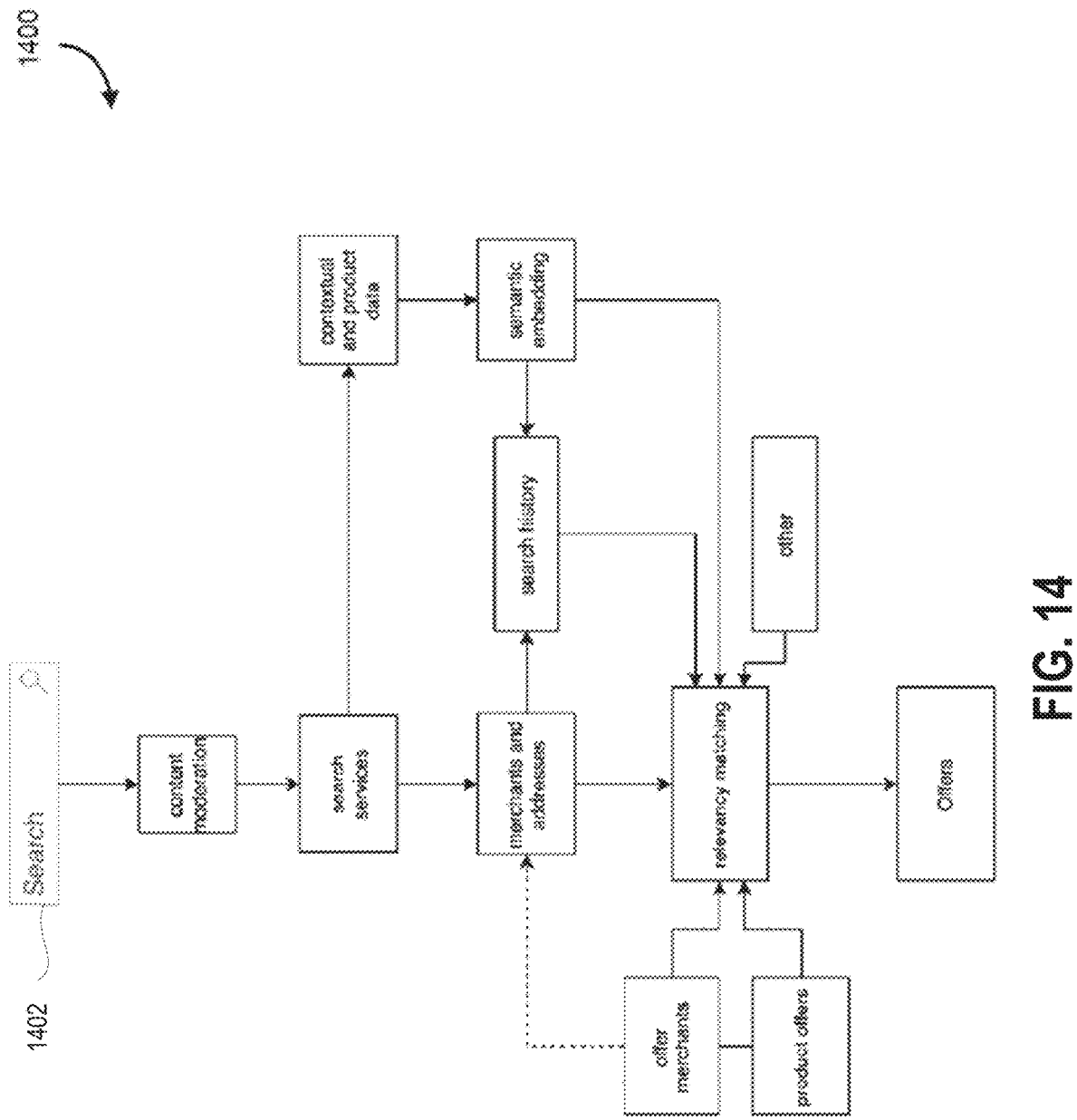
FIG. 14 is an example flow diagram of a relevancy enhancement, according to some embodiments.

FIG. 14 is an example flow diagram of a relevancy enhancement approach, according to some embodiments.

In FIG. 14, the flow diagram 1400 is shown in example and the input string can be augmented based on additional information, such as semantically similar variant words obtained from search services, merchants and addresses, prior search history of the user or other users, and the specific variants and words being used can also be biased towards specific words found in offers such that relevancy of offers is enhanced. In further variations, NLP classification (if only on text) can be introduced. An example search query, for example, would be a search for 'px7' which is a headphones model).

The search results can include ranked merchant and non merchant websites. Additional information can be found on the product or merchant place type as an example. Any information on product, merchant, or site descriptions should be returned for additional processing. Merchant domains and subdomain information can be extracted from the web addresses returned and from offer merchant databases.

Custom NERs (Named Entity Recognition) can be used for this purpose, and could be more effective than applying regular expressions or rule based approaches for parsing merchant sites. For example, some merchants might not have their own domains but rather websites under social media platforms. There may also be some merchants that have one domain serving multiple.

A semantic understanding of returned searches can be implemented, for example, by processing returned results including descriptions of products, to help improve on relevancy. Entity recognition and semantic embeddings alongside other NLP capabilities can used to help for a better understanding of intents. Search history processed results may also help with relevancy, as the user might be looking for book jackets in previous searches, and thus the system, in that context, should not show offers or rather rank first offers on clothing. Additional inputs from other predictive services, descriptive information (trending, popular) may also be aggregated as needed and used as additional weighted inputs to help for better offer rankings.

Further Embodiments

The data process linkage system described in some embodiments wherein the processor is further configured to:

instantiate a machine learning model data architecture adapted for reinforcement learning, the machine learning model data architecture including one or more weighed interconnections between nodes representing the first data set, the second data set, and the set of offer parameters; and train the machine learning model data architecture based on user selections of offer parameters leading to positive out-come based interactions in the second data set; and wherein the transforming of the set of offer parameters or offer selections for the target user includes selecting one or more offers for the user based at least on an output value generated by the trained machine learning model data architecture.

In another embodiment, wherein the selecting one or more offers for the user includes selecting a plurality of offers for the user to be rendered on the display of the computing device.

In another embodiment, wherein the plurality of offers are utilized as a set of multi-armed bandit training inputs for the machine learning model data architecture.

In another embodiment, wherein the plurality of offers are selected as a predefined number of offers ranked based relevancy scores generated for the user corresponding to each offer of the plurality of offers.

In another embodiment, wherein the relevancy scores are each generated based on a semantic distance from a query string input by the user.

In another embodiment, wherein the plurality of offers are selected based on a ranking of the semantic distance corresponding to each offer of the plurality of offers.

In another embodiment, wherein a first offer of the plurality of offers is selected based on a highest relevancy score of the relevancy scores, and subsequent offers of the plurality of offers are selected based on neighbor relationships obtained from a graph data structure of offer relationships.

In another embodiment, wherein if there are no available neighbor relationships obtained from the graph data structure of offer relationships, an offer having a next highest semantic distance is selected.

In another embodiment, wherein the graph data structure of offer relationships is established between offers, or wherein the graph data structure of offer relationships is established for all offers corresponding to a specific merchant.

In another embodiment, wherein the query string input by the user is processed to generate a set of semantic variants, and wherein the semantic distance is determined based on the set of semantic variants.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A data process linkage system, the system comprising:
a processor coupled to computer memory configured to:
retrieve a first data set representative of intent-based interactions with one or more web pages hosted on a network associated with one or more users, wherein the first data set representative of intent-based interactions includes web search and browser based interactions, including tracked search query terms;
retrieve a second data set representative of outcome-based interactions with one or more payment processors associated with the one or more users, wherein the second data set representative of outcome-based interactions includes one or more records of proposed or processed payment transactions, wherein the one or more records of processed payment transactions only include fields for prices associated with a payment transaction, and individual product or service level spending is estimated from the second data set by parsing each proposed or processed payment transaction into one or more individual product or service transactions through a machine-based classification learning model utilizing at least the first data set representative of intent-based interactions to assign a computer-estimated individual product or service transaction classification for at least one proposed or processed payment transaction;
generate, from the first data set and the second data set in accordance with exposed privacy permissions of the one or more users, one or more data linkages between the first data set and the second data set;
transform, based on the one or more data linkages, a set of offer parameters or offer selections for a target user;
wherein the first data set and the second data set are both loaded into a secured memory region of a trusted execution environment, the processor is further configured to control a trusted execution environment to retrieve the first data set and the second data set for conducting a query within the trusted execution environment to generate the one or more data linkages, wherein the trusted execution environment is configured such that external access to the first data set and the second data set is prohibited and the query is validated by a data privacy custodian data process prior to returning the transformed one or more data linkages; and
render, on a display of a computing device utilized by the target user in interacting with a web page of the one or more webpages, a visual display element representative of the transformed set of offer parameters or offer selections for the target user.

2. The data process linkage system of claim 1, wherein the assigned computer-estimated individual product or service transaction classification is encapsulated into the one or more data linkages and utilized to transform the set of offer parameters or offer selections for the target user; and
   wherein the transformed offer parameters or offer selections are associated with the assigned computer-estimated individual product or service transaction classification.

3. The data process linkage system of claim 1, wherein the data privacy custodian data process of the trusted execution environment requires at least one encryption key associated with each user of the one or more users to decrypt the first data set and to decrypt the second data set to conduct the query.

4. The data process linkage system of claim 3, wherein the at least one encryption key includes a plurality of keys for each user of the one or more users such that each user of the one or more users is able to control a level of privacy through provisioning different keys of the plurality of keys for decryption by the trusted execution environment to conduct the query.

5. The data process linkage system of claim 1, wherein the data process linkage system is operable on one or more computing systems of a data center.

6. The data process linkage system of claim 5, wherein the data process linkage system is a special purpose computing device operating on a dedicated server in the data center, and coupled to a messaging bus to obtain the first data set and the second data set.

7. The data process linkage system of claim 6, wherein the dedicated server is configured to orchestrate one or more data processes operating on a mobile device associated with the target user.

8. A data process linkage method, the method comprising:
   retrieving a first data set representative of intent-based interactions with one or more web pages hosted on a network associated with one or more users, wherein the first data set representative of intent-based interactions includes web search and browser based interactions, including tracked search query terms;
   retrieving a second data set representative of outcome-based interactions with one or more payment processors associated with the one or more users, wherein the second data set representative of outcome-based interactions includes one or more records of proposed or processed payment transactions, wherein the one or more records of processed payment transactions only include fields for prices associated with a payment transaction, and individual product or service level spending is estimated from the second data set by parsing each proposed or processed payment transaction into one or more individual product or service transactions through a machine-based classification learning model utilizing at least the first data set representative of intent-based interactions to assign a computer-estimated individual product or service transaction classification for at least one proposed or processed payment transaction;
   generating, from the first data set and the second data set in accordance with exposed privacy permissions of the one or more users, one or more data linkages between the first data set and the second data set;
   transforming, based on the one or more data linkages, a set of offer parameters or offer selections for a target user;
   wherein the first data set and the second data set are both loaded into a secured memory region of a trusted execution environment, the processor is further configured to control a trusted execution environment to retrieve the first data set and the second data set for conducting a query within the trusted execution environment to generate the one or more data linkages, wherein the trusted execution environment is configured such that external access to the first data set and the second data set is prohibited and the query is validated by a data privacy custodian data process prior to returning the transformed one or more data linkages; and
   rendering, on a display of a computing device utilized by the target user in interacting with a web page of the one or more webpages, a visual display element representative of the transformed set of offer parameters or offer selections for the target user.

9. The data process linkage method of claim 1, wherein the assigned computer-estimated individual product or service transaction classification is encapsulated into the one or more data linkages and utilized to transform the set of offer parameters or offer selections for the target user; and
   wherein the transformed offer parameters or offer selections are associated with the assigned computer-estimated individual product or service transaction classification.

10. The data process linkage method of claim 1, wherein the data privacy custodian data process of the trusted execution environment requires at least one encryption key associated with each user of the one or more users to decrypt the first data set and to decrypt the second data set to conduct the query.

11. The data process linkage method of claim 10, wherein the at least one encryption key includes a plurality of keys for each user of the one or more users such that each user of the one or more users is able to control a level of privacy through provisioning different keys of the plurality of keys for decryption by the trusted execution environment to conduct the query.

12. The data process linkage method of claim 8, wherein the data process linkage method is operable on one or more computing servers in a data center.

13. The data process linkage method of claim 12, wherein the one or more computing servers include a special purpose computing device operating on a dedicated server in the data center, and coupled to a messaging bus to obtain the first data set and the second data set.

14. A non-transitory computer readable medium storing machine interpretable instruction sets, which when executed by a processor, cause the processor to perform a data process linkage method, the method comprising:
   retrieving a first data set representative of intent-based interactions with one or more web pages hosted on a network associated with one or more users, wherein the first data set representative of intent-based interactions includes web search and browser based interactions, including tracked search query terms;
   retrieving a second data set representative of outcome-based interactions with one or more payment processors associated with the one or more users, wherein the second data set representative of outcome-based interactions includes one or more records of proposed or processed payment transactions, wherein the one or more records of processed payment transactions only include fields for prices associated with a payment transaction, and individual product or service level spending is estimated from the second data set by parsing each proposed or processed payment transaction into one or more individual product or service transactions through a machine-based classification learning model utilizing at least the first data set representative of intent-based interactions to assign a computer-estimated individual product or service transaction classification for at least one proposed or processed payment transaction;

generating, from the first data set and the second data set in accordance with exposed privacy permissions of the one or more users, one or more data linkages between the first data set and the second data set;

transforming, based on the one or more data linkages, a set of offer parameters or offer selections for a target user;

wherein the first data set and the second data set are both loaded into a secured memory region of a trusted execution environment, the processor is further configured to control a trusted execution environment to retrieve the first data set and the second data set for conducting a query within the trusted execution environment to generate the one or more data linkages, wherein the trusted execution environment is configured such that external access to the first data set and the second data set is prohibited and the query is validated by a data privacy custodian data process prior to returning the transformed one or more data linkages; and rendering, on a display of a computing device utilized by the target user in interacting with a web page of the one or more webpages, a visual display element representative of the transformed set of offer parameters or offer selections for the target user.

* * * * *